(12) United States Patent
Miyoshi (10) Patent No.: US 12,372,974 B2
(45) Date of Patent: Jul. 29, 2025

(54) NUMERICAL CONTROLLER, AND STORAGE MEDIUM

(71) Applicant: Fanuc Corporation, Yamanashi (JP)

(72) Inventor: Takashi Miyoshi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 120 days.

(21) Appl. No.: 18/034,948

(22) PCT Filed: Nov. 16, 2021

(86) PCT No.: PCT/JP2021/042067
§ 371 (c)(1),
(2) Date: May 2, 2023

(87) PCT Pub. No.: WO2022/107760
PCT Pub. Date: May 27, 2022

(65) Prior Publication Data
US 2023/0400866 A1    Dec. 14, 2023

(30) Foreign Application Priority Data
Nov. 20, 2020 (JP) ................................ 2020-193375

(51) Int. Cl.
*G05D 1/00* (2024.01)
*B64U 10/14* (2023.01)
*B64U 101/00* (2023.01)

(52) U.S. Cl.
CPC ............. *G05D 1/101* (2013.01); *B64U 10/14* (2023.01); *B64U 2101/00* (2023.01); *B64U 2201/00* (2023.01); *B64U 2201/20* (2023.01)

(58) Field of Classification Search
CPC .... G05D 1/101; B64U 10/14; B64U 2101/00; B64U 2201/00; B64U 2201/20
See application file for complete search history.

(56) References Cited

U.S. PATENT DOCUMENTS

| | | | |
|---|---|---|---|
| 2017/0269594 A1 | 9/2017 | Sydnor | |
| 2020/0070976 A1 | 3/2020 | Beckhoff | |

FOREIGN PATENT DOCUMENTS

| | | | | |
|---|---|---|---|---|
| JP | 2019059314 | A | 4/2019 | |
| JP | 2019120986 | A | 7/2019 | |
| JP | 6632095 | B1 | 1/2020 | |
| JP | 2020520838 | A | 7/2020 | |
| JP | 2020142326 | A | 9/2020 | |
| WO | WO-2017111971 | A1 * | 6/2017 | ............. B64C 27/08 |

(Continued)

OTHER PUBLICATIONS

Beckhoff, Automation System and Method for Operating an Automation System (Year: 2018).*

(Continued)

*Primary Examiner* — Kito R Robinson
*Assistant Examiner* — Roy Rhee
(74) *Attorney, Agent, or Firm* — Buchanan Ingersoll & Rooney PC (57) ABSTRACT

A numerical controller acquires a move command for an unmanned aerial vehicle in a coordinate system set in the numerical controller. The numerical controller converts a coordinate system of the move command into a coordinate system for controlling the unmanned aerial vehicle, and outputs the move command to the unmanned aerial vehicle.

10 Claims, 9 Drawing Sheets

(56) References Cited

FOREIGN PATENT DOCUMENTS

WO    WO-2018177873 A1 * 10/2018 ........... B64C 39/024

OTHER PUBLICATIONS

International Search Report and Written Opinion for International Application No. PCT/JP2021/042067, dated Feb. 8, 2022, 6 pages.
Office Action (Decision to Grant a Patent) issued May 21, 2024, by the Japan Patent Office in corresponding Japanese Patent Application No. 2022-563766 and an English Translation of the Office Action. (5 pages).

* cited by examiner

NUMERICAL CONTROLLER, AND STORAGE MEDIUM

CROSS REFERENCE TO RELATED APPLICATIONS

This is the U.S. National Phase application of PCT/JP2021/042067, filed Nov. 16, 2021, which claims priority to Japanese Patent Application No. 2020-193375, filed Nov. 20, 2020, the disclosures of these applications being incorporated herein by reference in their entireties for all purposes.

FIELD OF THE INVENTION

The present invention relates to a numerical controller for controlling a machine tool, and a computer-readable storage medium.

BACKGROUND OF THE INVENTION

Patent Literature 1 discloses a robot system that includes a robot, a robot controller for controlling the robot, a teaching device for sending a teaching signal for the robot to the robot controller in response to an input of teaching made by an operator, an unmanned aerial vehicle having an imaging device, and a flight control unit for controlling the flight of the unmanned aerial vehicle such that the imaging device can continuously take images of an object necessary for teaching based on the teaching signal during the operation of the robot according to the teaching signal.

In general, robots are sometimes used within fences on a manufacturing floor with consideration for safety. According to Patent Literature 1, the flight of the unmanned aerial vehicle is controlled based on the teaching signal for controlling the robot during the operation of the robot, so that the operator can perform teaching on the robot even in an environment where it is difficult to see the movement of the robot directly from outside the fences.

There have conventionally been an increasing number of cases of using unmanned aerial vehicles (drones) for inventory management in warehouses, and monitoring the status of factories and so on. These unmanned aerial vehicles are flying objects and have flexible movement areas, and thus are expected to be used in new ways.

PRIOR ART DOCUMENT

Patent Literature

[Patent Literature 1] Japanese Patent Laid-Open Publication No. 2020-142326

SUMMARY OF THE INVENTION

Technology that utilizes unmanned aerial vehicle is desired in manufacturing floors.

One aspect of the present disclosure is a numerical controller that is configured to control a machine tool, and includes a move command acquisition unit that acquires a move command for an unmanned aerial vehicle in a coordinate system set to the numerical controller, a coordinate system conversion unit that converts the coordinate system of the move command into a coordinate system for controlling the unmanned aerial vehicle, and a move command output unit that outputs the move command converted by the coordinate system conversion unit to the unmanned aerial vehicle.

One aspect of the present disclosure is a storage medium that is and configured to store computer-readable commands, in which one or more processors execute the commands to thereby acquire a move command for an unmanned aerial vehicle in a coordinate system set to a numerical controller, convert the coordinate system of the move command into a coordinate system for controlling the unmanned aerial vehicle, and output the move command converted to the coordinate system for controlling the unmanned aerial vehicle to the unmanned aerial vehicle.

In accordance with the aspect of the invention, an unmanned aerial vehicle can be utilized in a manufacturing floor.

FIRST DISCLOSURE

Figure 1:
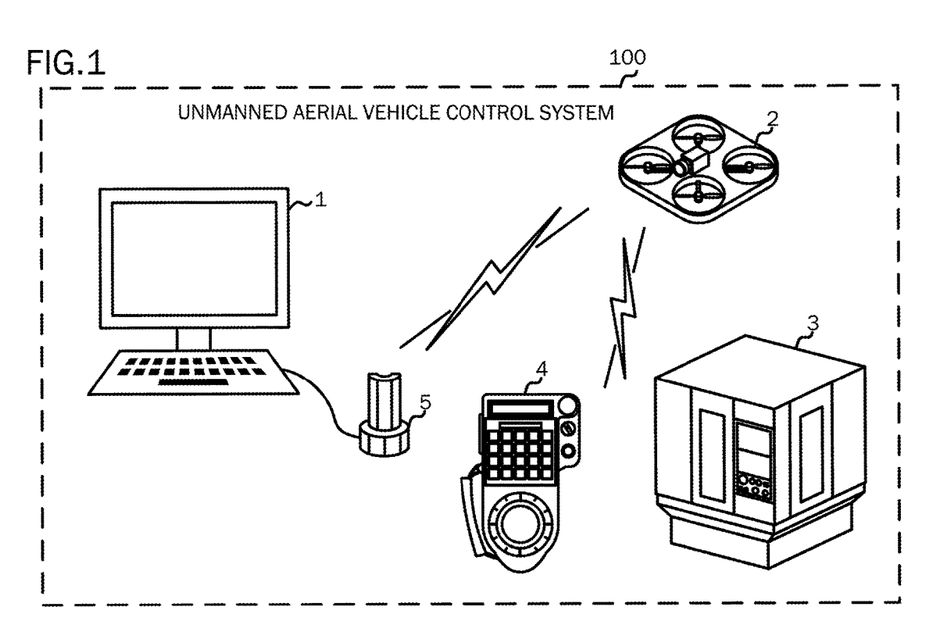
FIG. 1 is a conceptual diagram of an unmanned aerial vehicle control system.

FIG. 1 is a conceptual diagram of an unmanned aerial vehicle control system 100.

The unmanned aerial vehicle control system 100 includes a personal computer (PC) 1 that computes a self-location of an unmanned aerial vehicle on a three-dimensional map of a factory, one or more unmanned aerial vehicles 2, a numerical controller 3 that outputs a move command to the unmanned aerial vehicle 2, a pendant 4 that receives a move command from a user, and a radio communication device 5 that mediates communication between the unmanned aerial vehicle 2 and the PC 1.

The unmanned aerial vehicle control system 100 is installed in a factory building that includes the numerical controller 3. The unmanned aerial vehicle 2 moves around the factory to carry out tasks according to control information provided from the numerical controller 3.

Figure 2:
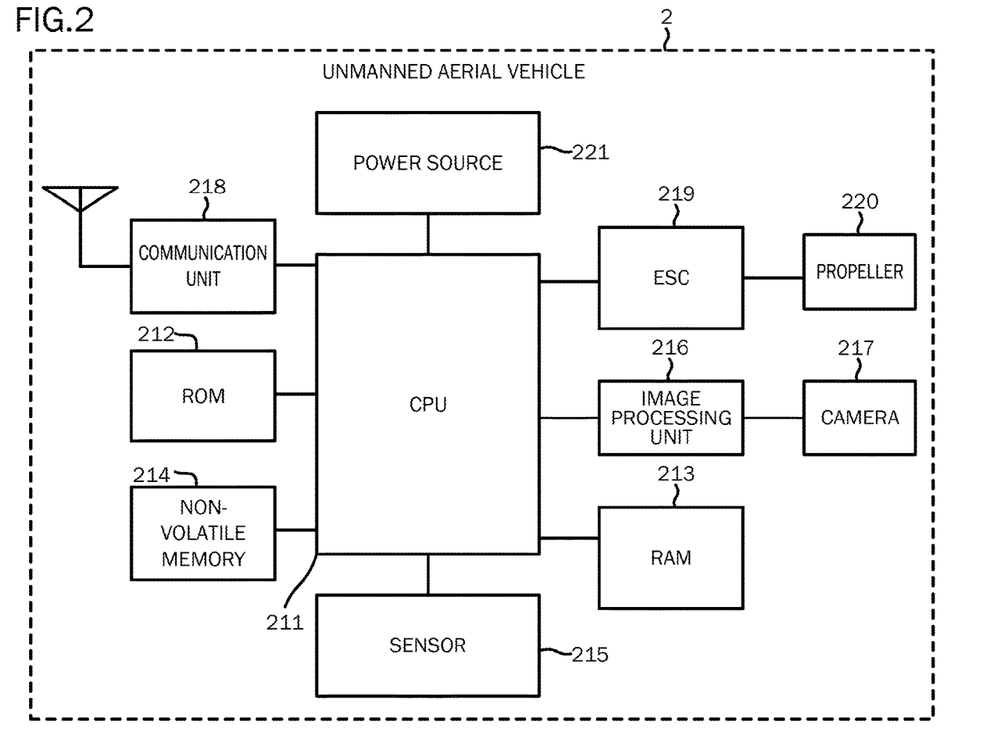
FIG. 2 is a hardware configuration diagram of an unmanned aerial vehicle.

The unmanned aerial vehicle 2 has a hardware configuration shown in FIG. 2. The unmanned aerial vehicle 2 includes a central processing unit (CPU) 211 that is a processor for controlling the overall unmanned aerial vehicle 2. The CPU 211 is configured to read a system program stored in a read-only memory (ROM) 212 via a bus to thereby control the overall unmanned aerial vehicle 2 in accordance with the system program. A random-access memory (RAM) 213 is configured to temporarily store temporary computation data and various pieces of data input by an external device, for instance.

A non-volatile memory 214 consists of a memory which is backed up by a battery, not shown, by way of example. In the non-volatile memory 214, a state of storage of data written therein is retained even when a power source 221 of the unmanned aerial vehicle 2 is turned off. The non-volatile memory 214 is configured to store, for example, pieces of data read from an external device, not shown, and pieces of data obtained from a communication device via a network. The pieces of data stored in the non-volatile memory 214 may be deployed into the RAM 213 when operating/using the unmanned aerial vehicle 2. Furthermore, the ROM 212 is configured to record beforehand various system programs, such as known programs.

A sensor 215 is an accelerometer, an angular velocity sensor, an electronic compass, a pressure sensor or a distance sensor. The electronic compass is for obtaining a direction of the unmanned aerial vehicle by magnetic force. The distance sensor is a light detection and ranging (LIDAR) sensor, for instance, that measures scattering light for pulsed laser irradiation.

The CPU 211 mounted on the unmanned aerial vehicle 2 serves as a flight controller or controller companion, for instance. The CPU 211 does not have to be one, and a plurality of CPUs 211 may be mounted according to their functions. The CPU 211 serving as a flight controller is configured to adjust the attitude of the airframe of the aerial vehicle to its appropriate position based on information acquired from the sensor 215. The CPU 211 determines tilt and movement of the unmanned aerial vehicle 2 based on an amount of speed variation of the unmanned aerial vehicle 2 acquired by an accelerometer, determines changes in the tilt and direction of the unmanned aerial vehicle 2 based on an amount of change in a rotational speed of the unmanned aerial vehicle 2 acquired from an angular velocity sensor, and determines the altitude of the unmanned aerial vehicle 2 based on air pressure acquired from a pressure sensor.

The CPU 211 serving as a controller companion is also configured to determine two-dimensional or three-dimensional point group data based on a value of scattering light acquired by a LIDAR sensor. The point group data will be an environmental map around the unmanned aerial vehicle 2. In addition to that, the CPU 211 can perform successive estimation of a movement amount of the unmanned aerial vehicle 2 by matching point groups to one another. The movement amount is added up so that a self-location can be estimated. Furthermore, in order to use the LIDAR sensor for the estimation of the self-location of the unmanned aerial vehicle 2, values acquired from the accelerometer and the angular velocity sensor may be combined.

An image processing unit 216 is configured to convert images taken by a camera 217 into appropriate data and output the data to the CPU 211. The camera 217 of the unmanned aerial vehicle 2 mainly takes pictures of a machine/machines selected by a user. This allows the user to grasp the state of a factory, such as values of instruments and an operating condition of each machine.

A radio communication unit 218 is configured to send and receive pieces of data to and from the PC 1 via the radio communication device 5. The PC 1 sends a command to the unmanned aerial vehicle 2. The command includes a flight plan of the unmanned aerial vehicle 2. The unmanned aerial vehicle 2 conducts a task according to the flight plan provided by the numerical controller 3.

An electric speed controller (ESC) 219 is also called an amplifier and is attached to each propeller. The ESC 219 controls the revolutions per minute (RPM) of a motor according to instructions from the CPU 211. The control is conducted on the RPMs of propellers 220 to cause a difference in air pressure above and below the propellers, and the difference in the air pressure provides a lift that enables the unmanned aerial vehicle 2 to fly. Lift is upward force that pushes up the unmanned aerial vehicle 2. The speed and the direction of travel of the unmanned aerial vehicle 2 can be changed by varying the RPMs of the propellers 220.

The control of the RPMs of the propellers 220 allows the unmanned aerial vehicle 2 to hover (the lift and the force of gravity are equivalent), ascend (increase in the RPMs of four motors), descend (decrease in the RPMs of the four motors), move back and forth and left to right (the increase in the RPMs of two propellers opposite to the direction of travel moves the unmanned aerial vehicle in the direction of travel), turn counterclockwise (increase in the RPMs of right-hand propellers), turn clockwise (increase in the RPMs of left-hand propellers) and so on.

Figure 3:
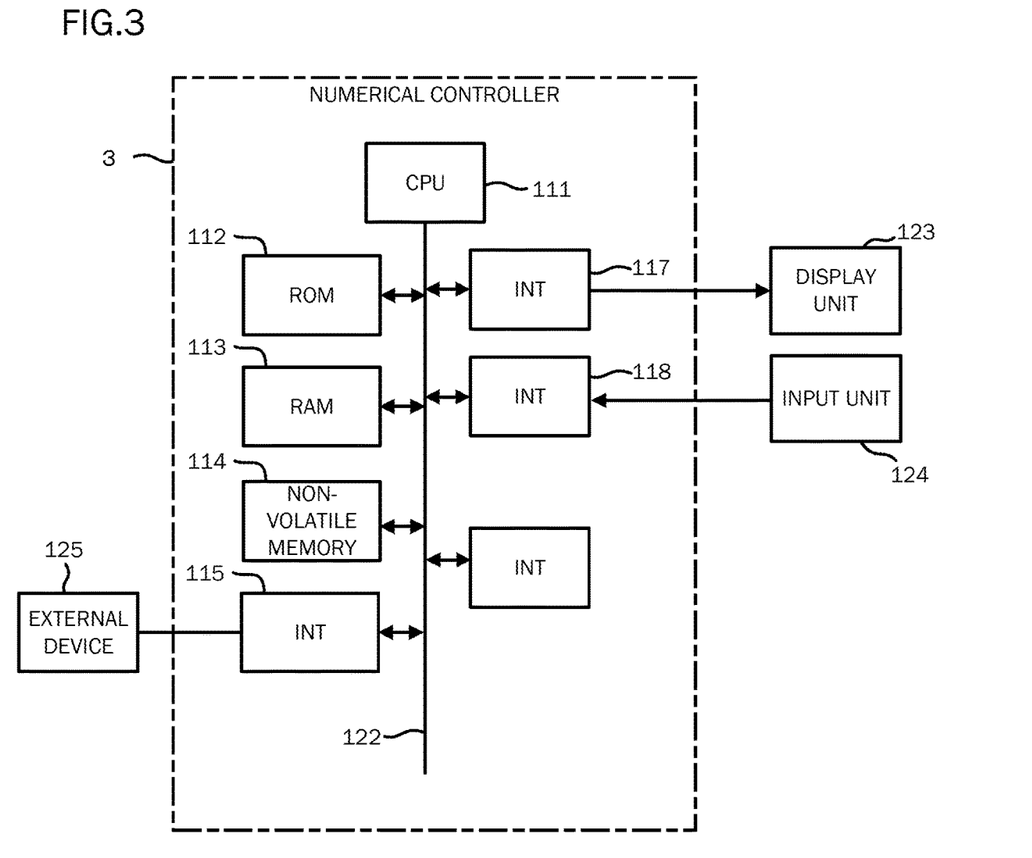
FIG. 3 is a hardware configuration diagram of a numerical controller.

The numerical controller 3 has a hardware configuration shown in FIG. 3.

A CPU 111 included in the numerical controller 3 is a processor configured to control the overall numerical controller 3. The CPU 111 reads a system program stored in a ROM 112 via a bus 122 to thereby control the overall numerical controller 3 according to the system program. A RAM 113 is configured to temporarily store temporary computation data and display data, various pieces of data input from an external device and others. The PC 1 has the same hardware configuration as that in FIG. 3.

A non-volatile memory 114 consists of a memory or solid state drive (SSD) which is backed up by a battery, not shown, by way of example. In the non-volatile memory 114, a state of storage of data written therein is retained even when a power source of the numerical controller 3 is turned off. The non-volatile memory 114 is configured to store, for example, pieces of data read from an external device 125 via an interface 115, pieces of data input through an input unit 124, and pieces of data acquired from the unmanned aerial vehicle via a radio communication device. The pieces of data stored in the non-volatile memory 114 may be deployed into the RAM 113 when the data are executed/used. Furthermore, the ROM 112 is configured to record beforehand various system programs, such as known programs.

A display unit 123 is configured to display pieces of data or similar which are obtained by executing the pieces of data, programs and others read in the memory and output via an interface 117. In addition to that, the input unit 124 that consists of a keyboard, a pointing device and others is configured to pass data and others input by a programmer via an interface 118 to the CPU 111.

Figure 4:
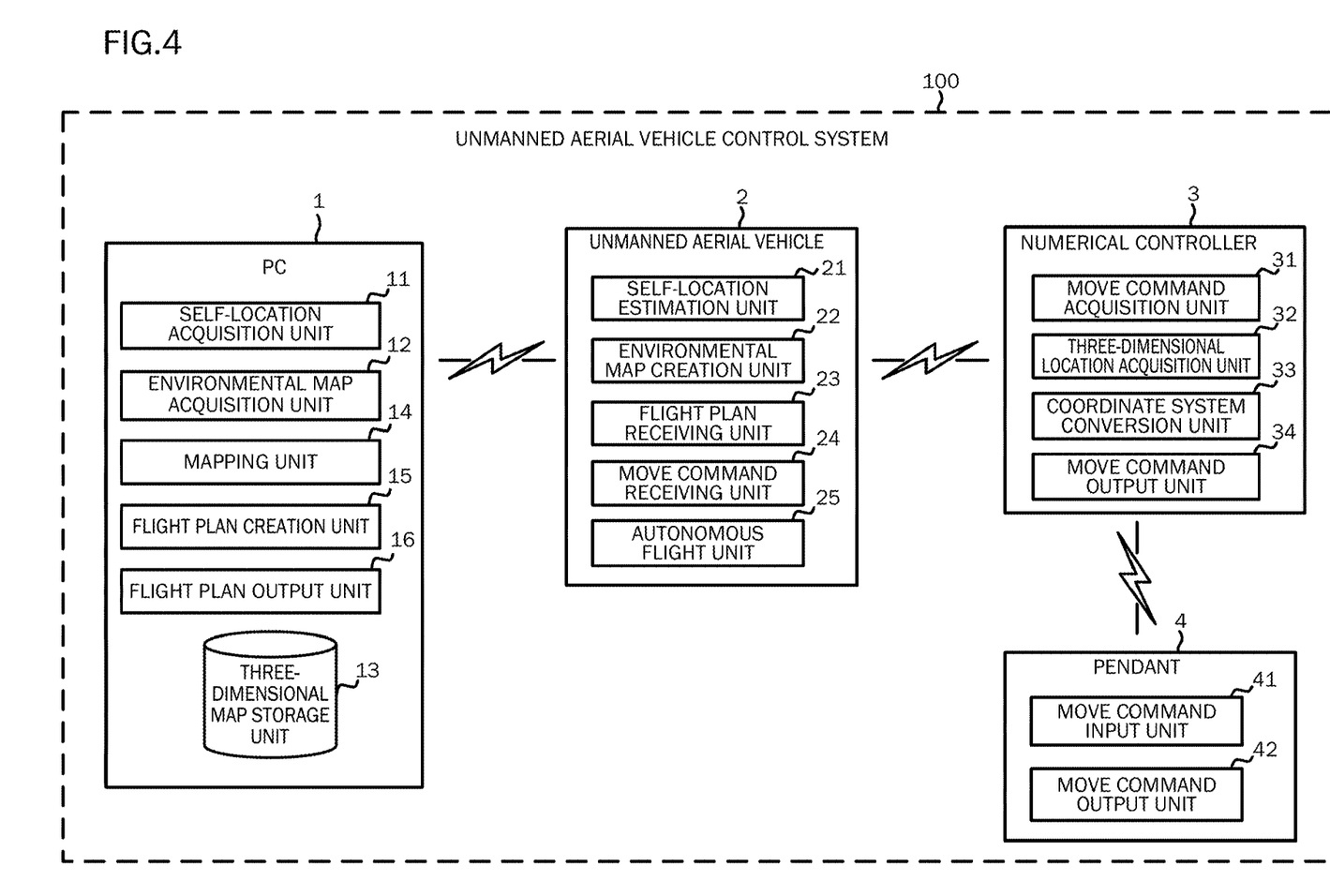
FIG. 4 is a block diagram of an unmanned aerial vehicle control system according to a first disclosure.

FIG. 4 is a block diagram of the unmanned aerial vehicle control system 100 according to a first disclosure.

The PC 1 includes a self-location acquisition unit 11 that acquires a self-location of the unmanned aerial vehicle 2, an environmental map acquisition unit 12 that acquires an environmental map surrounding the unmanned aerial vehicle 2, a three-dimensional map storage unit 13 that stores a three-dimensional map of a factory, a mapping unit 14 that maps the environmental map on a three-dimensional map, a flight plan creation unit 15 that creates a flight plan of the unmanned aerial vehicle, and a flight plan output unit 16 that outputs a flight plan to the unmanned aerial vehicle 2.

The self-location acquisition unit 11 is configured to acquire a self-location from the unmanned aerial vehicle 2, and the environmental map acquisition unit 12 is configured to acquire an environmental map from the unmanned aerial vehicle 2. The mapping unit 14 is configured to associate the environmental map of the unmanned aerial vehicle 2 with a three-dimensional map based on such as characteristic points, so as to map the self-location of the unmanned aerial vehicle 2 on a coordinate system of the three-dimensional map.

The flight plan creation unit 15 is configured to create a flight plan of the unmanned aerial vehicle 2. A flight plan is created based on a coordinate system of a three-dimensional map stored in the PC 1. A coordinate system of a three-dimensional map is for controlling the unmanned aerial vehicle 2. The flight plan output unit 16 is configured to output a flight plan to the radio communication device 5. The flight plan is then sent to the unmanned aerial vehicle 2 through the radio communication device 5.

The unmanned aerial vehicle 2 includes a self-location estimation unit 21 that estimates a self-location, an environmental map creation unit 22 that creates an environmental map surrounding the unmanned aerial vehicle 2, a flight plan receiving unit 23 that receives a flight plan of the unmanned aerial vehicle 2, a move command receiving unit 24 that receives a move command by manual input from the pendant 4, and an autonomous flight unit 25 that performs autonomous flight according to the flight plan, the move command and the like.

The self-location estimation unit 21 is configured to determine tilt and movement of the unmanned aerial vehicle 2 based on an amount of speed variation of the unmanned aerial vehicle 2 acquired by an accelerometer, determine changes in the tilt and direction of the unmanned aerial vehicle 2 based on an amount of change in a rotational speed of the unmanned aerial vehicle 2 acquired from an angular velocity sensor, and determine the altitude of the unmanned aerial vehicle 2 based on air pressure acquired from a pressure sensor, thereby determining a movement amount of the aerial vehicle itself. In addition to that, the self-location estimation unit 21 conducts matching on the environmental map to continuously estimate a movement amount of the unmanned aerial vehicle 2. The movement amount is added up so that a self-location can be estimated.

The environmental map creation unit 22 is also configured to determine two-dimensional or three-dimensional point group data based on a value of scattering light acquired by a LIDAR sensor. The point group data will be an environmental map surrounding the unmanned aerial vehicle 2.

The flight plan receiving unit 23 is configured to receive a flight plan from the PC 1 through the radio communication device 5.

The move command receiving unit 24 is configured to receive a move command from the numerical controller 3.

The autonomous flight unit 25 is configured to make autonomous flight in response to the move command. More specifically, the autonomous flight unit 25 estimates the self-location based on the movement amount and the attitude of the aerial vehicle determined from the values obtained from various sensors, such as accelerometer, angular velocity sensor and pressure sensor, and makes the flight to a destination according to the flight plan, the move command and others.

The numerical controller 3 includes a move command acquisition unit 31 that acquires a move command input from the pendant 4, such as movement amount or coordinates, a three-dimensional location acquisition unit 32 that acquires the self-location of the unmanned aerial vehicle 2 on a three-dimensional map, a coordinate system conversion unit 33 that converts a coordinate system of the move command into a coordinate system (three-dimensional map) of the unmanned aerial vehicle 2, and a move command output unit 34 that outputs the move command converted into the coordinate system of the three-dimensional map to the unmanned aerial vehicle 2.

The pendant 4 includes a move command input unit 41 that has a manual pulse generator and a plurality of buttons to input a move command, such as movement amount or coordinates of the unmanned aerial vehicle 2, and a move command output unit 42 that outputs a move command input by a user to the numerical controller 3.

Figure 5:
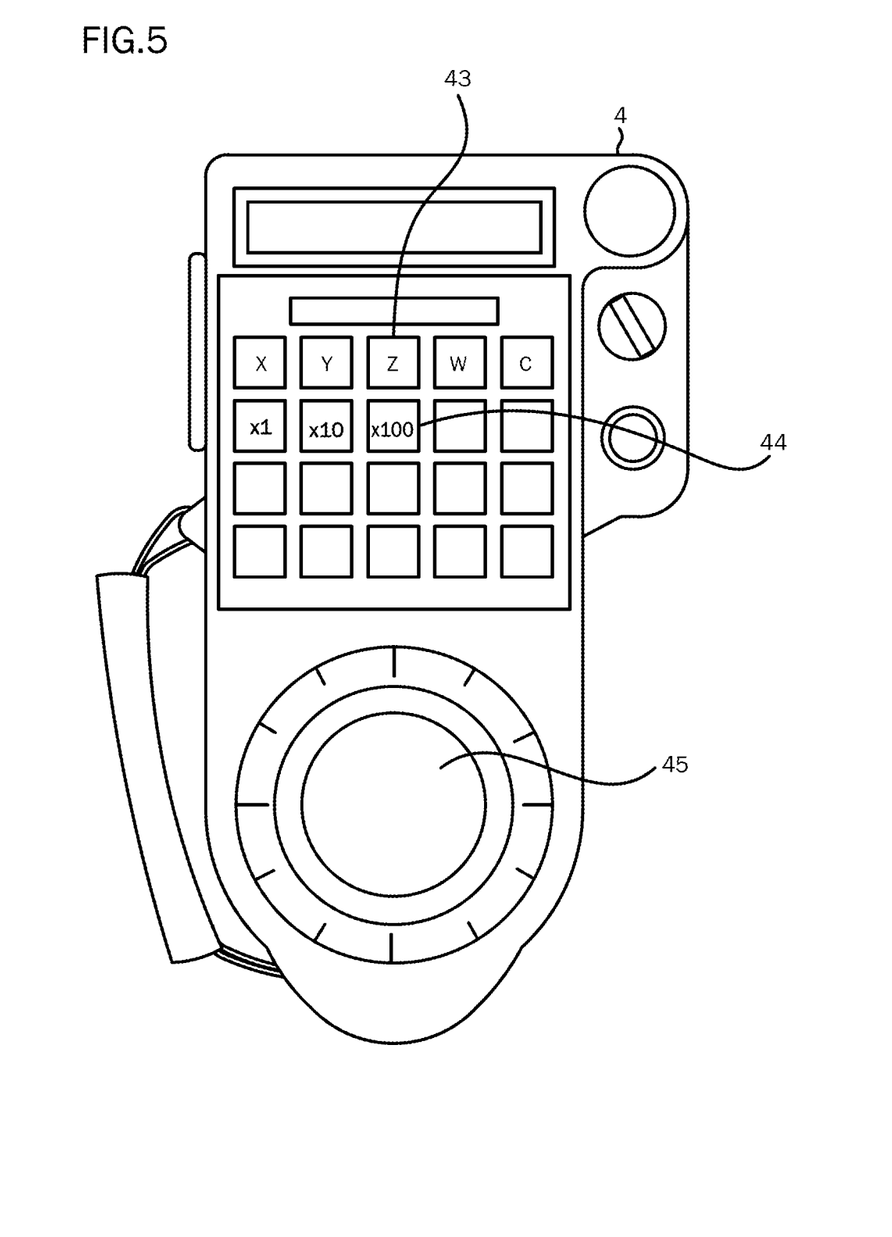
FIG. 5 shows an example of a pendant.

FIG. 5 shows an example of the pendant 4. The pendant 4 of FIG. 5 is provided with buttons 43 for selecting X-, Y- and Z-axes of coordinate, buttons 44 for scaling an input, and a dial 45 for inputting a movement amount. An axis is selected and the dial 45 is turned to input a direction of movement and a movement amount of the unmanned aerial vehicle. Alternatively, an axis is selected and the dial 45 is turned to input a coordinate of a destination of the unmanned aerial vehicle 2. Values input through the pendant 4 are values of a coordinate system set for controlling a machine tool, not shown, by the numerical controller 3.

A coordinate system used in the numerical controller 3 is an orthogonal coordinate system consisting of three axes, primarily X-axis, Y-axis and Z-axis. There is equipment capable of controlling four axes including a rotation axis in addition to the above-mentioned axes, or five axes further including an inclined axis. The directions of the X-axis, Y-axis and Z-axis differs depending on the type of the equipment. With respect to a milling machine or three-dimensional machining center, an X-axis represents a left and right in which the right is positive (+), a Y-axis represents forward and backward in which the backward is positive (+), and a Z-axis represents up and down in which the up is positive (+). The coordinate system used in the numerical controller 3 includes, such as, "machine coordinate system", "work coordinate system" and "local coordinate system" according to the location of the origin point.

Figure 6:
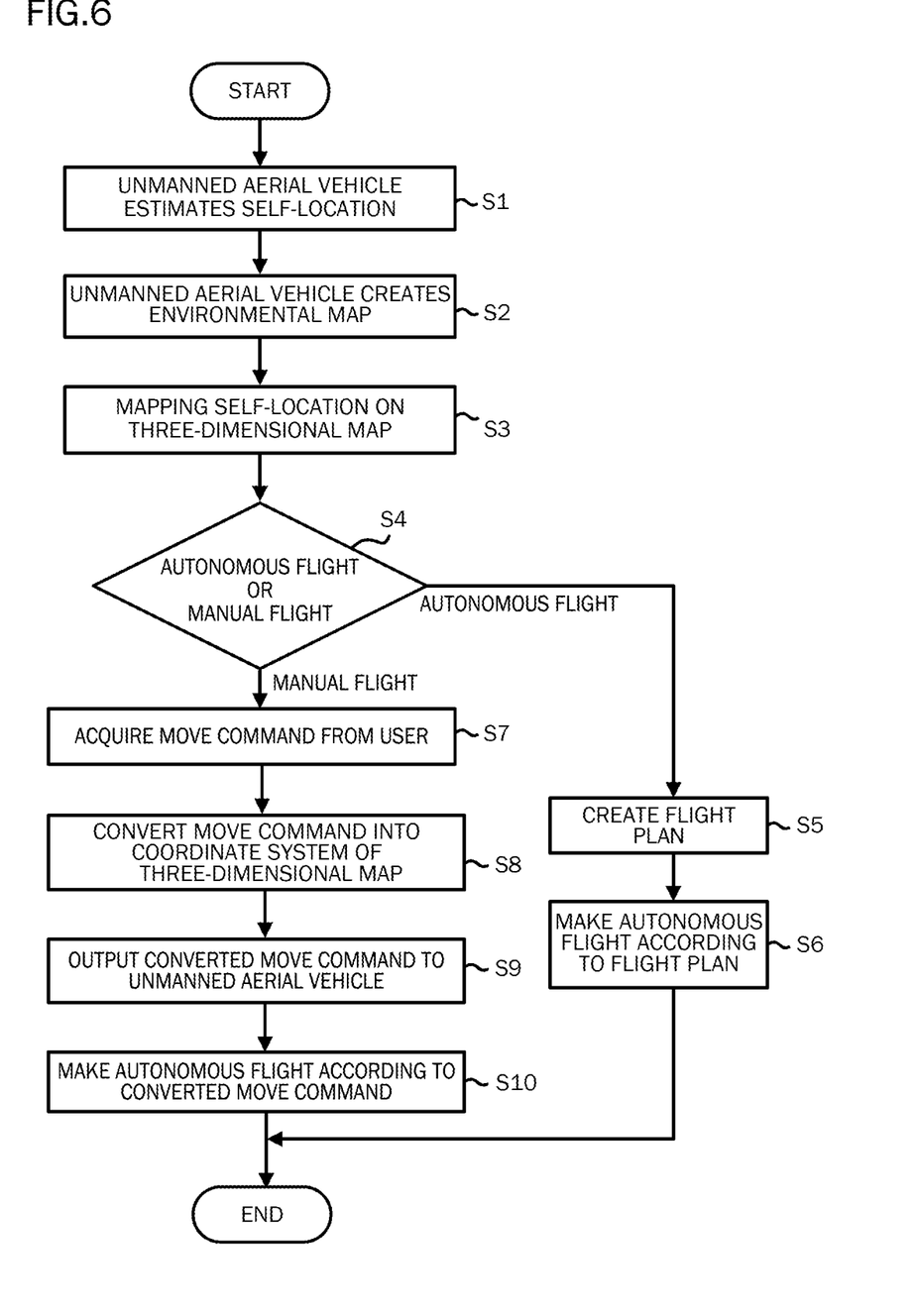
FIG. 6 is a flowchart illustrating an operation of the unmanned aerial vehicle control system according to the first disclosure.

FIG. 6 is a flowchart showing an operation of the unmanned aerial vehicle control system 100 according to the first disclosure. The unmanned aerial vehicle 2 firstly estimates its self-location (Step S1) and in turn creates an environmental map (Step S2). The PC 1 then maps the self-location of the unmanned aerial vehicle 2 and the environmental map on a three-dimensional map to obtain the location of the unmanned aerial vehicle 2 on the three-dimensional map (Step S3).

In a case where the unmanned aerial vehicle 2 makes autonomous flight (Step S4: autonomous flight), the PC 1 creates a flight plan of the unmanned aerial vehicle 2 (Step S5) and output the plan to the unmanned aerial vehicle 2. The unmanned aerial vehicle 2 makes the autonomous flight according to the flight plan received from the PC 1 (Step S6).

In a case where the unmanned aerial vehicle 2 makes manual flight (Step S4: manual flight), the pendant 4 acquires a move command from the user (Step S7). The numerical controller 3 converts the move command acquired by the pendant 4 into a coordinate system of the three-dimensional map (step S8).

The numerical controller 3 outputs the move command thus converted into the coordinate system of the three-dimensional map to the unmanned aerial vehicle 2 (Step S9).

The unmanned aerial vehicle 2 then makes autonomous flight according to the move command from the numerical controller 3 (Step S10).

As described above, the unmanned aerial vehicle control system 100 according to the first disclosure includes the coordinate system conversion unit 33 for converting a coordinate system of a machine tool into a coordinate system of the unmanned aerial vehicle 2, and uses the pendant 4 which is an input device of the machine tool to control the unmanned aerial vehicle 2, thereby enabling to operate the unmanned aerial vehicle 2 without adding a special device to the numerical controller 3. As an input device, a control panel or mobile terminal for the numerical controller 3 may be used, instead of the pendant 4. These input devices are easy to operate because the user of the numerical controller 3 is used to operate them.

The illustrative disclosure uses the LIDAR sensor as a distance sensor. Alternatively, an infrared sensor, ultrasonic sensor or radar sensor with radio waves may be used as the distance sensor. Furthermore, a camera or image sensor can be used as the distance sensor. In a case of using a camera, an AR marker, AR tag, QR code (registered trademark) or similar can be used in combination with the camera.

As an example of using no distance sensors, there is a method for estimating the self-location by using beacons or intensity of radio waves of a wireless local area network (LAN). In a case of making determination about the coordinates of the self-location based on the relative location from the source of the generation of the radio waves, the absolute values of the coordinates are determined. It is therefore not necessary to map the self-location onto a three-dimensional map. The present disclosure does not particularly limit a method for estimating the self-location of the unmanned aerial vehicle 2.

SECOND DISCLOSURE

Figure 7:
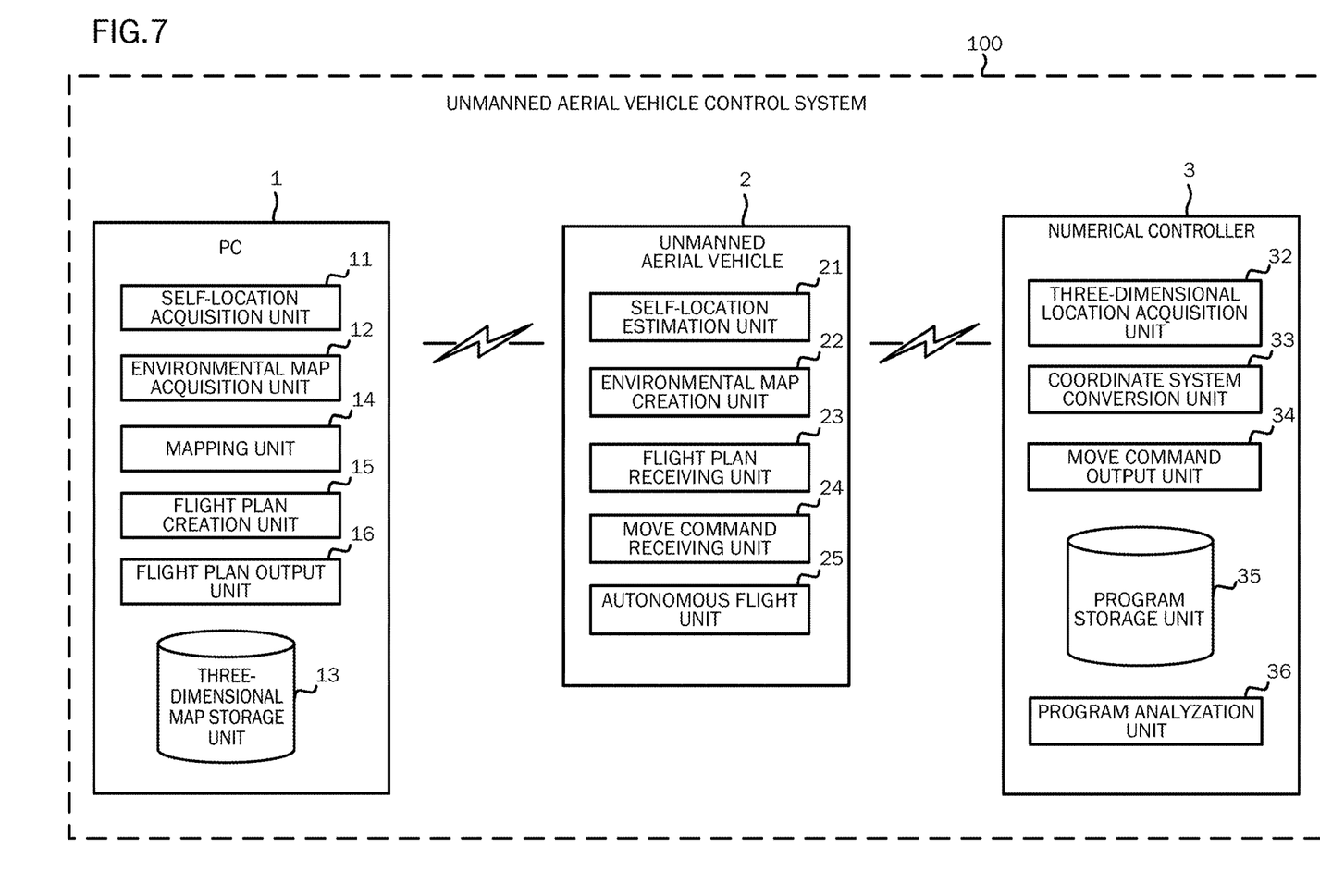
FIG. 7 is a block diagram of an unmanned aerial vehicle control system according to a second disclosure.

The unmanned aerial vehicle control system 100 according to a second disclosure consists of the PC 1, the unmanned aerial vehicle 2 and the numerical controller 3, as shown in FIG. 7. The numerical controller 3 according to the second disclosure includes a program storage unit 35 and a program analyzation unit 36, so as to control the unmanned aerial vehicle 2 according to an NC program which is a control program of the numerical controller 3.

The program storage unit 35 is configured to store the NC program. The NC program is for controlling the machine tool by means of the numerical controller 3. The NC program of the illustrative disclosure includes an NC program that is for controlling the unmanned aerial vehicle 2 (also called control program for the unmanned aerial vehicle 2).

The program analyzation unit 36 is configured to output a command content of an NC program to the coordinate conversion unit 33, if the NC program is a control program for the unmanned aerial vehicle 2. If the NC program is not a control program for the unmanned aerial vehicle 2, normal processing is conducted.

The NC program is for setting a coordinate system and executing a move command for a tool, a workpiece or others by using G-codes.

The G-code includes "Coordinate System Setting: G92, G54", "Setting of designating coordinates: G90, G91", "Plane Designation: G17, G18, G19", "Movement of axis: G00, G01", "Dwell: G04", "Acceleration: G08", "Deceleration: G09", "Canned Cycle: G81 to G89" and "Cancel Canned Cycle: G80", by way of example.

In an NC program of "G53 G0 G90 X100 Y50", the code "G53" represents "coordinate system (machine coordinate system)", the code "G0" represents "command content (positioning command)", the code "G90" represents "absolute command", the values "X100 Y50" represent the coordinates of a destination. That is to say, the program "G53 G0 G90 X100 Y50" is a command for "positioning" on the coordinates "X100 Y50" in "machine coordinate system".

When the program analyzation unit 36 reads these G-codes, the coordinate system conversion unit 33 converts the coordinates "X100 Y50" of the numerical controller 3 into coordinates of a three-dimensional map. The move command output unit 34 then outputs the move command thus converted into the coordinates of the three-dimensional map to the unmanned aerial vehicle 2.

The coordinate system conversion unit 33 also takes account of a difference in coordinate systems and a difference in coordinate commands. The NC program includes "work coordinate system", "local coordinate system" and the like, in addition to "machine coordinate system". Furthermore, the method of designating coordinates includes "absolute command" and "incremental command". "Absolute command" is a method for instructing coordinates with absolute values from "machining origin (X0, Y0)". "Incremental command" is a method for instructing coordinates with relative values from the current position. The coordinate system conversion unit 33 takes account of this command to convert the coordinate system of the numerical controller 3 into the coordinate system of the three-dimensional map.

The G-codes can provide instructions on the speed and acceleration of the unmanned aerial vehicle 2 by using F-codes. The instruction may be more than one. For example, the code "G01" is in the form of "G01 X_ Y_ Z_ F_;". The code "F_ (F-code)" in this block can instruct a speed. For example, in the case "G01 X20. F1000", only an X-axis moves to a location of "20" at a speed of "F1000". When the speed is designated, the coordinate system conversion unit 33 converts the speed designated with the F-code into a speed on a three-dimensional map, and the move command output unit 34 then outputs the converted speed to the unmanned aerial vehicle 2.

Figure 8:
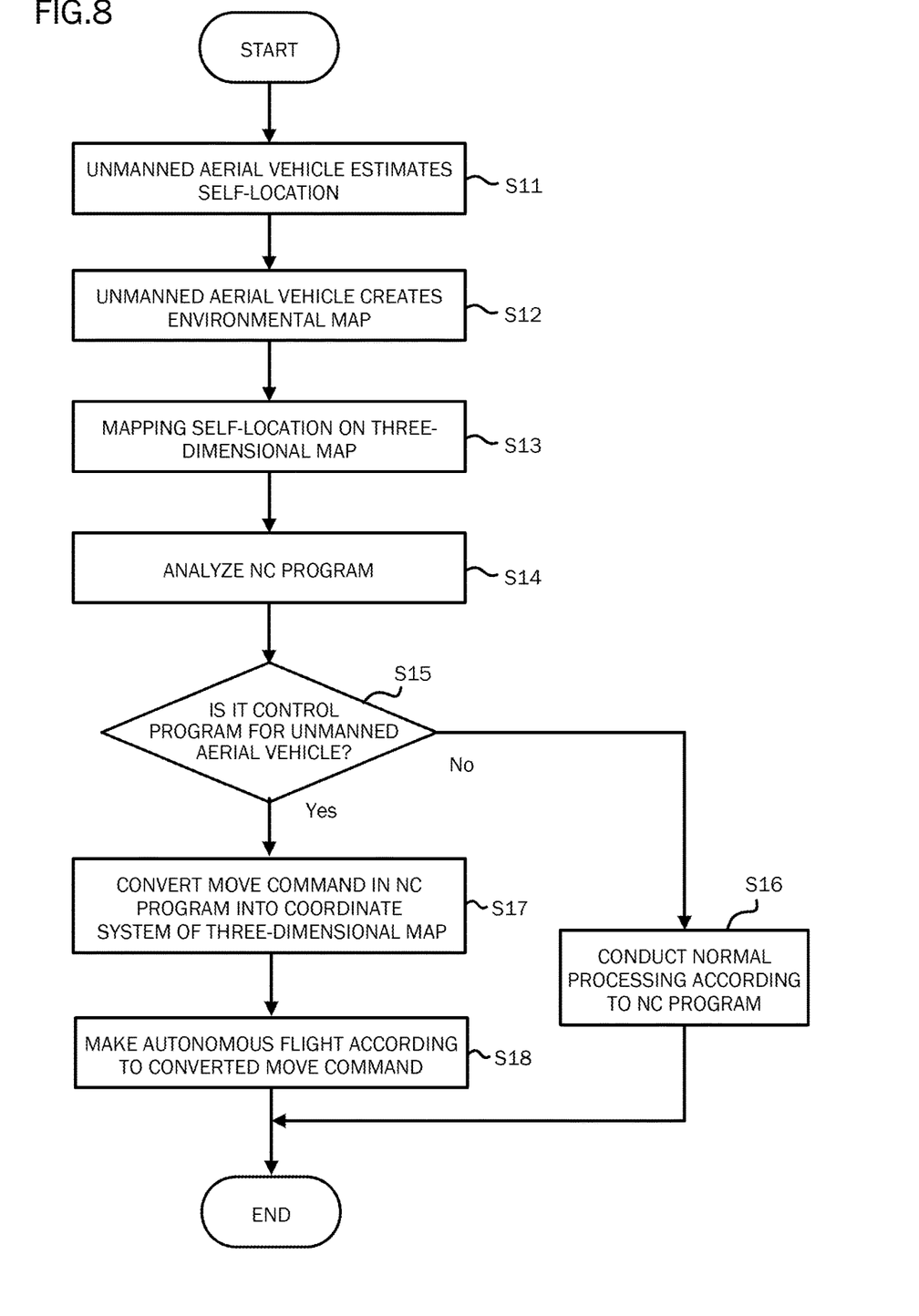
FIG. 8 is a flowchart illustrating an operation of the unmanned aerial vehicle control system according to the second disclosure.

FIG. 8 is a flowchart showing an operation of the unmanned aerial vehicle control system 100 according to the second disclosure. The unmanned aerial vehicle 2 firstly estimates its self-location (Step S11), and in turn creates an environmental map (Step S12). The PC 1 then maps the self-location of the unmanned aerial vehicle 2 and the environmental map onto a three-dimensional map of a factory to thereby obtain the location of the unmanned aerial vehicle on the three-dimensional map (Step S13).

The program analyzation unit 36 of the numerical controller 3 analyzes an NC program (Step S14), and when the NC program is not a control program for the unmanned aerial vehicle 2 (Step S15: No), then carries out normal processing according to the NC program (Step S16).

When the NC program is the control program for the unmanned aerial vehicle 2 (Step S15: Yes), the coordinate system conversion unit 33 converts move commands written in the NC program, such as coordinates, speed and acceleration, into a coordinate system of the three-dimensional map (Step S17). The move command output unit 34 outputs the move commands converted into the coordinate system of the three-dimensional map to the unmanned aerial vehicle 2. The unmanned aerial vehicle 2 then makes autonomous flight according to the move commands from the numerical controller 3 (Step S18).

As described above, the unmanned aerial vehicle control system 100 according to the second disclosure can control the unmanned aerial vehicle 2 by means of the NC program. It allows the user of the numerical controller 3 to control the unmanned aerial vehicle 2 by using the NC program without acquiring any programs of the unmanned aerial vehicle 2. The NC program has a good usability because its language is familiar to the user of the numerical controller 3.

THIRD DISCLOSURE

Figure 9:
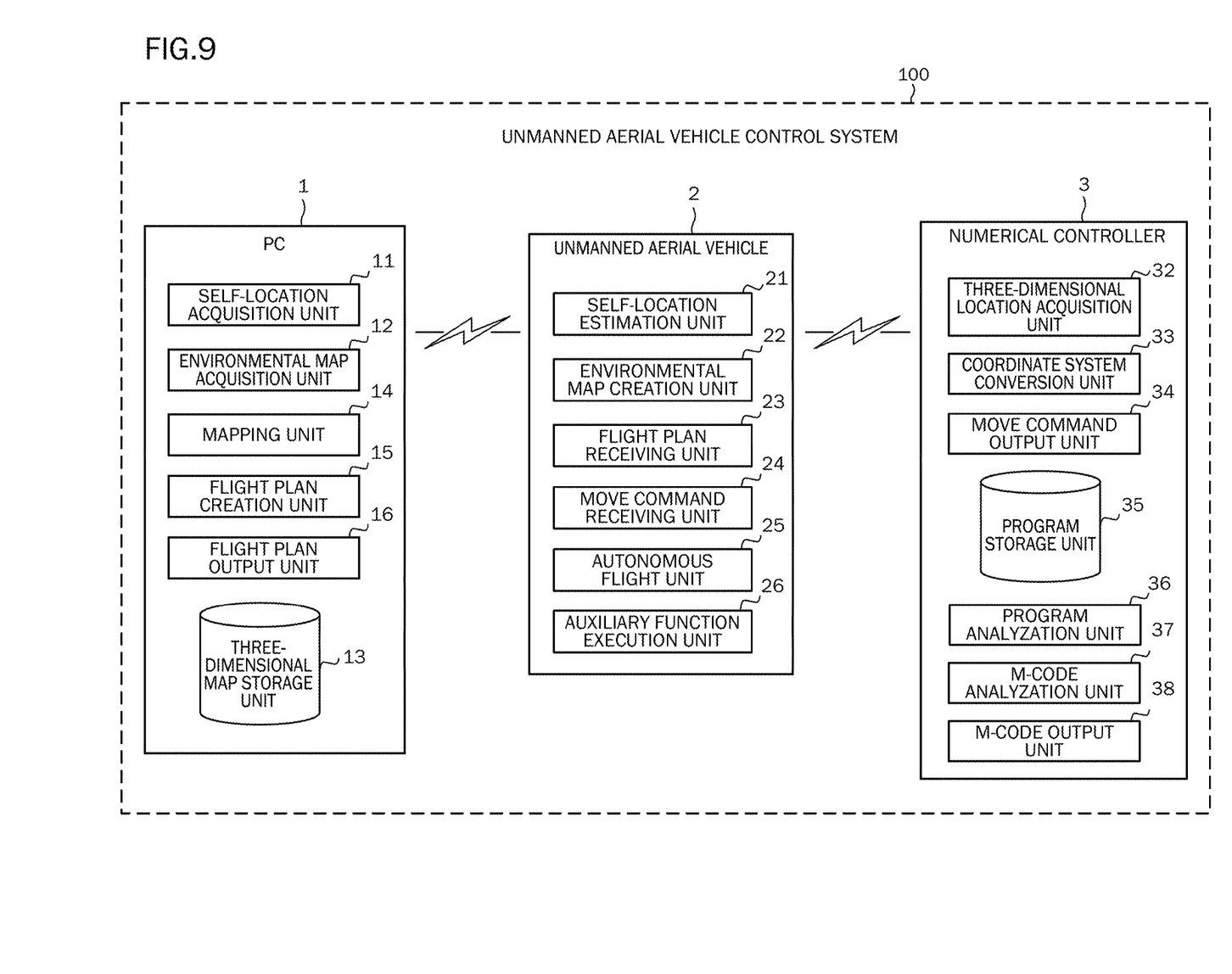
FIG. 9 is a block diagram of an unmanned aerial vehicle control system according to a third disclosure.

The unmanned aerial vehicle controller 100 according to a third disclosure includes the PC 1, the unmanned aerial vehicle 2 and the numerical controller 3, as shown in FIG. 9. The numerical controller 3 in the third disclosure includes an M-code analyzation unit 37 and an M-code output unit 38. The unmanned aerial vehicle 2 in the third disclosure has an auxiliary function execution unit 26. M-code is also referred to as auxiliary code that is a command for outputting a signal to such as a programmable logic controller (PLC) connected to the numerical controller 3 or a robot.

M-code includes "Program Stop (Pause): M00", "Optional Stop: M01", "Program End: M02, M30", "Tool Change: M06", "Pallet Change: M60", "Subprogram Call: M98", and "Subprogram End: M99", by way of example.

The M-codes can be used to issue commands, such as "tool change" and "pallet change", to the unmanned aerial vehicle 2. In addition to that, the M-codes can be used to issue a command for turning on and off an accessory device.

The M-code analyzation unit 37 is configured to analyze M-codes written in an NC program and converts the M-codes into commands for the unmanned aerial vehicle 2. The M-code output unit 38 is configured to output the commands converted from the M-codes to the unmanned aerial vehicle 2.

The auxiliary function execution unit 26 of the unmanned aerial vehicle 2 executes auxiliary functions of the unmanned aerial vehicle 2 according to the commands received from the numerical controller 3. The auxiliary function of the unmanned aerial vehicle 2 includes "tool change", "pallet change" and "ON/OFF of accessory devices", by way of example. As to the functions "tool change" and "pallet change", for instance, a tool and a pallet mounted on the unmanned aerial vehicle 2 are dropped.

In addition to the existing M-codes, the user can create a new code. Thus, the user can create a necessary code on his/her own accord to add an auxiliary function controllable by the NC program.

Figure 10:
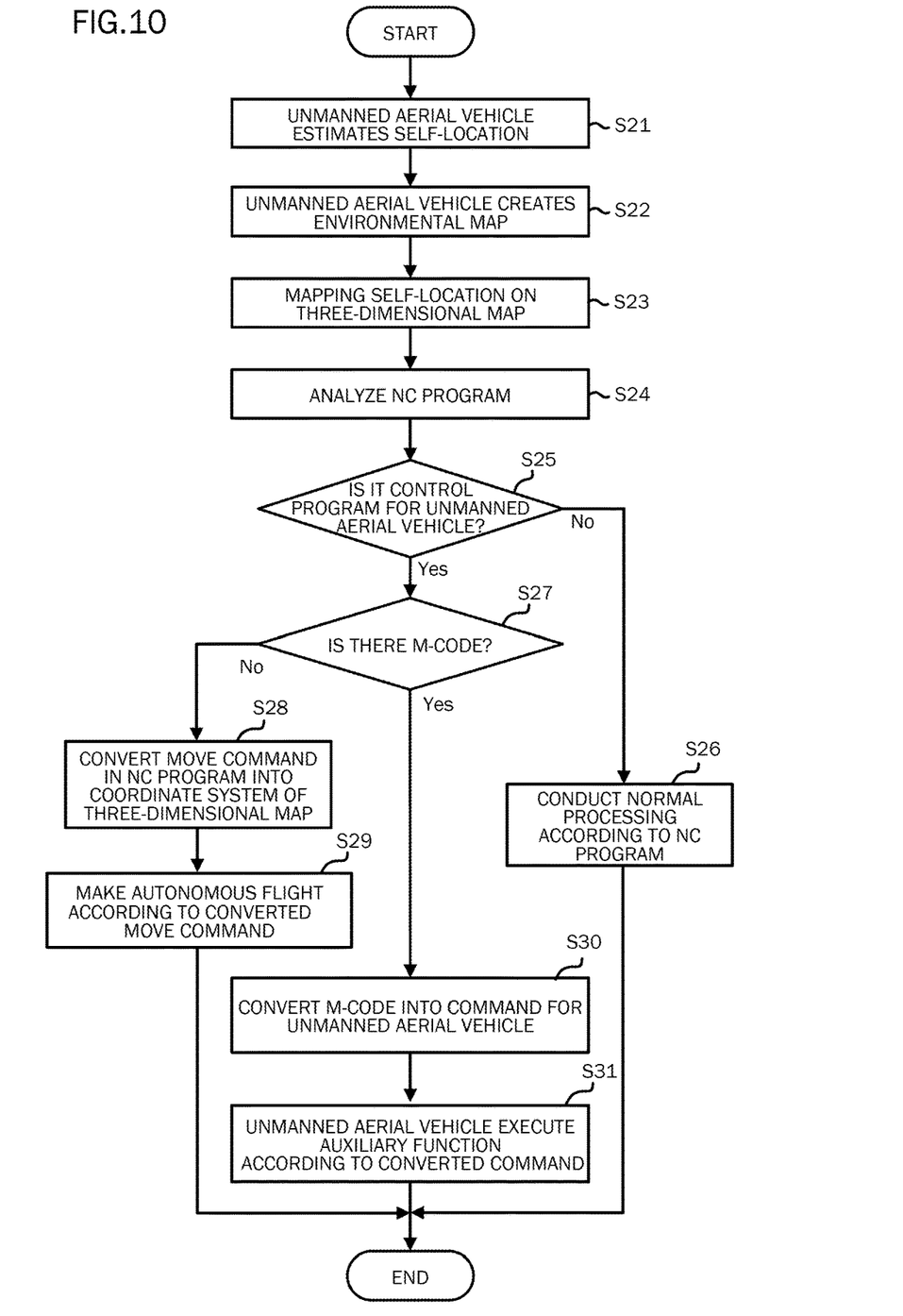
FIG. 10 is a flowchart illustrating an operation of the unmanned aerial vehicle control system according to the third disclosure.

FIG. 10 is a flowchart showing an operation of the unmanned aerial vehicle control system 100 according to the third disclosure. The unmanned aerial vehicle 2 firstly estimates its self-location (Step S21), and in turn creates an environmental map (Step S22). The PC 1 then maps the self-location of the unmanned aerial vehicle 2 and the environmental map onto a three-dimensional map of a factory to thereby obtain the location of the unmanned aerial vehicle on the three-dimensional map (Step S23).

The program analyzation unit 36 of the numerical controller 3 analyzes an NC program (Step S24), and when the NC program is not a control program for the unmanned aerial vehicle 2 (Step S25: No), then carries out normal processing according to the NC program (Step S26).

When the NC program is the control program for the unmanned aerial vehicle 2 (Step S25: Yes) and no M-codes are included in the block under analysis (Step S27: No), the coordinate system conversion unit 33 converts move commands written in the NC program, such as coordinates, speed and acceleration, into a coordinate system of the three-dimensional map (Step S28). The move command output unit 34 outputs the move commands converted into the coordinate system of the three-dimensional map to the unmanned aerial vehicle 2. The unmanned aerial vehicle 2 then makes autonomous flight according to the move commands from the numerical controller 3 (Step S29).

When the M-codes are written in the NC program (Step S27: Yes), the M-code analyzation unit 37 analyzes the command contents of the M-codes and converts the M-codes into commands for the unmanned aerial vehicle 2 (Step S30). The M-code output unit 38 outputs the commands based on the M-codes to the unmanned aerial vehicle 2. The unmanned aerial vehicle 2 operates according to the converted commands (Step S31).

As described above, the unmanned aerial vehicle control system 100 according to the third disclosure has the M-code analyzation unit 37 that converts the M-codes written in the NC program into commands for the unmanned aerial vehicle 2. Essentially, the M-codes are auxiliary codes to be used for sending commands to peripheral devices of a machine tool, the commands being discharge of a coolant, tool change and so on. The unmanned aerial vehicle controller 100 in the third disclosure can also use the M-codes to control the auxiliary functions of the unmanned aerial vehicle, such as "tool change", "pallet change" and "ON/OFF of accessory devices".

REFERENCE SIGNS LIST

100 Unmanned Aerial Vehicle Control System
1 Personal Computer (PC)
2 Unmanned Aerial Vehicle
3 Numerical Controller
4 Pendant
5 Radio Communication Device
11 Self-Location Acquisition Unit
12 Environmental Map Acquisition Unit
13 Three-Dimensional Map Storage Unit
14 Mapping Unit
21 Self-Location Estimation Unit
22 Environmental Map Creation Unit
25 Autonomous Flight Unit
26 Auxiliary Function Execution Unit
32 Three-Dimensional Location Acquisition Unit
31 Move Command Acquisition Unit
33 Coordinate System Conversion Unit
34 Move Command Output Unit
35 Program Storage Unit
36 Program Analyzation Unit
37 M-Code Analyzation Unit
38 M-Code Output Unit
41 Move Command Input Unit
42 Move Command Output Unit
111 CPU
112 ROM
113 RAM
114 Non-Volatile Memory
211 CPU
212 ROM
213 RAM
214 Non-Volatile Memory

The invention claimed is:
1. A numerical controller for controlling a machine tool, the numerical controller comprising a processor configured to:

acquire a move command including coordinates for an unmanned aerial vehicle in a coordinate system set in the numerical controller;

analyze a control program for setting the coordinate system in the numerical controller, wherein the control program comprises G-codes representing coordinates of a destination;

convert the coordinates of the destination coordinates of a three-dimensional map for controlling the unmanned aerial vehicle; and output the move command to the unmanned aerial vehicle.

2. The numerical controller according to claim 1, wherein the processor is further configured to acquire the move command manually input by a user from an input device of the numerical controller.

3. The numerical controller according to claim 1, wherein the processor is further configured to acquire the move command for the unmanned aerial vehicle written in the control program.

4. The numerical controller according to claim 1, wherein the move command includes one or more of speed, acceleration and deceleration of the unmanned aerial vehicle.

5. The numerical controller according to claim 3, wherein the processor is further configured to:

convert codes regarding auxiliary functions of the unmanned aerial vehicle, if any in the control program, into commands for the auxiliary functions of the unmanned aerial vehicle; and output the commands for the auxiliary functions to the unmanned aerial vehicle.

6. A non-transitory computer-readable storage medium for storing computer-readable commands, wherein one or more processors execute the commands to:

acquire a move command including coordinates for an unmanned aerial vehicle in a coordinate system set in a numerical controller;

analyze a control program for setting the coordinate system in the numerical controller, wherein the control program comprises G-codes representing coordinates of a destination;

convert the coordinates of the destination into coordinates of a three-dimensional map for controlling the unmanned aerial vehicle; and output the move command converted into the coordinate system for controlling the unmanned aerial vehicle to the unmanned aerial vehicle.

7. The non-transitory computer-readable storage medium according to claim 6, wherein the move command for the unmanned aerial vehicle manually input by a user is acquired from an input device of the numerical controller.

8. The non-transitory computer-readable storage medium according to claim 6, wherein a control program of the numerical controller is analyzed to acquire the move command for the unmanned aerial vehicle written in the control program.

9. The non-transitory computer-readable storage medium according to claim 6, wherein the move command includes one or more of speed, acceleration and deceleration of the unmanned aerial vehicle.

10. The non-transitory computer-readable storage medium according to claim 8, wherein if codes regarding auxiliary functions of the unmanned aerial vehicle are written in the control program, the codes are converted into commands for the auxiliary functions of the unmanned aerial vehicle, and the commands for the auxiliary functions are output to the unmanned aerial vehicle.

\* \* \* \* \*

UNITED STATES PATENT AND TRADEMARK OFFICE
CERTIFICATE OF CORRECTION

| | | |
|---|---|---|
| PATENT NO. | : 12,372,974 B2 | Page 1 of 1 |
| APPLICATION NO. | : 18/034948 | |
| DATED | : July 29, 2025 | |
| INVENTOR(S) | : Takashi Miyoshi | |

It is certified that error appears in the above-identified patent and that said Letters Patent is hereby corrected as shown below:

In the Claims

In Column 11, Line 8 Claim 1, the phrase "destination coordinates" should read -- destination into coordinates --.

In Column 11, Line 28 Claim 5, the phrase "vehicle, if any in the control program," should read -- vehicle in the control program --.

Signed and Sealed this
Sixth Day of January, 2026

John A. Squires
*Director of the United States Patent and Trademark Office*